United States Patent
de Abreu Amorim

(10) Patent No.: US 9,607,484 B2
(45) Date of Patent: Mar. 28, 2017

(54) METHODS OF OPERATING A SELF-SERVICE CHECK DEPOSITING TERMINAL TO PROVIDE A CHECK DEPOSIT TRANSACTION RECEIPT

(75) Inventor: Manuel Albeto de Abreu Amorim, Cambridge (CA)

(73) Assignee: NCR Corporation, Duluth, GA (US)

( * ) Notice: Subject to any disclaimer, the term of this patent is extended or adjusted under 35 U.S.C. 154(b) by 1342 days.

(21) Appl. No.: 12/077,798

(22) Filed: Mar. 21, 2008

(65) Prior Publication Data
US 2009/0236412 A1 Sep. 24, 2009

(51) Int. Cl.
G06Q 40/00 (2012.01)
G07D 11/00 (2006.01)
G07F 19/00 (2006.01)
G06Q 20/04 (2012.01)
G07F 7/04 (2006.01)
G07F 7/12 (2006.01)

(52) U.S. Cl.
CPC ......... *G07F 19/202* (2013.01); *G06Q 20/042* (2013.01); *G07F 7/04* (2013.01); *G07F 7/125* (2013.01); *G07F 19/20* (2013.01)

(58) Field of Classification Search
CPC ...... G06Q 40/02; G06Q 20/04; G06Q 20/042; G06Q 40/00; G06Q 20/40; G06Q 20/102; G06Q 20/1085; G06Q 20/18; G06K 7/10861; G07F 19/20; G07F 19/202; G07F 7/04; G07F 7/08; G07F 19/205; G07F 7/0833; G07F 19/201; G07F 19/206; G07F 19/207; G07F 19/203
USPC ......................................................... 235/379
See application file for complete search history.

(56) References Cited

U.S. PATENT DOCUMENTS

| | | | | |
|---|---|---|---|---|
| 5,121,945 A | * | 6/1992 | Thomson et al. | 283/58 |
| 5,751,842 A | * | 5/1998 | Riach et al. | 235/379 |
| 7,137,551 B1 | * | 11/2006 | Crews et al. | 235/379 |
| 2002/0084321 A1 | * | 7/2002 | Martens | G06K 7/10861 235/379 |
| 2002/0106102 A1 | * | 8/2002 | Au et al. | 382/100 |

* cited by examiner

*Primary Examiner* — Thien T Mai
(74) *Attorney, Agent, or Firm* — Schwegman, Lundberg & Woessner

(57) ABSTRACT

A method is provided of operating a self-service check depositing terminal to provide a check deposit transaction receipt. The method comprises receiving a check from a depositor, capturing original check image data which is representative of an image of the check, embedding at least some alphanumeric text data which is representative of alphanumeric text into at least some of the original check image data to provide modified check image data which is representative of a composite image of the check and the alphanumeric text, and printing the composite image of the check and the alphanumeric text onto a check deposit transaction receipt.

4 Claims, 13 Drawing Sheets

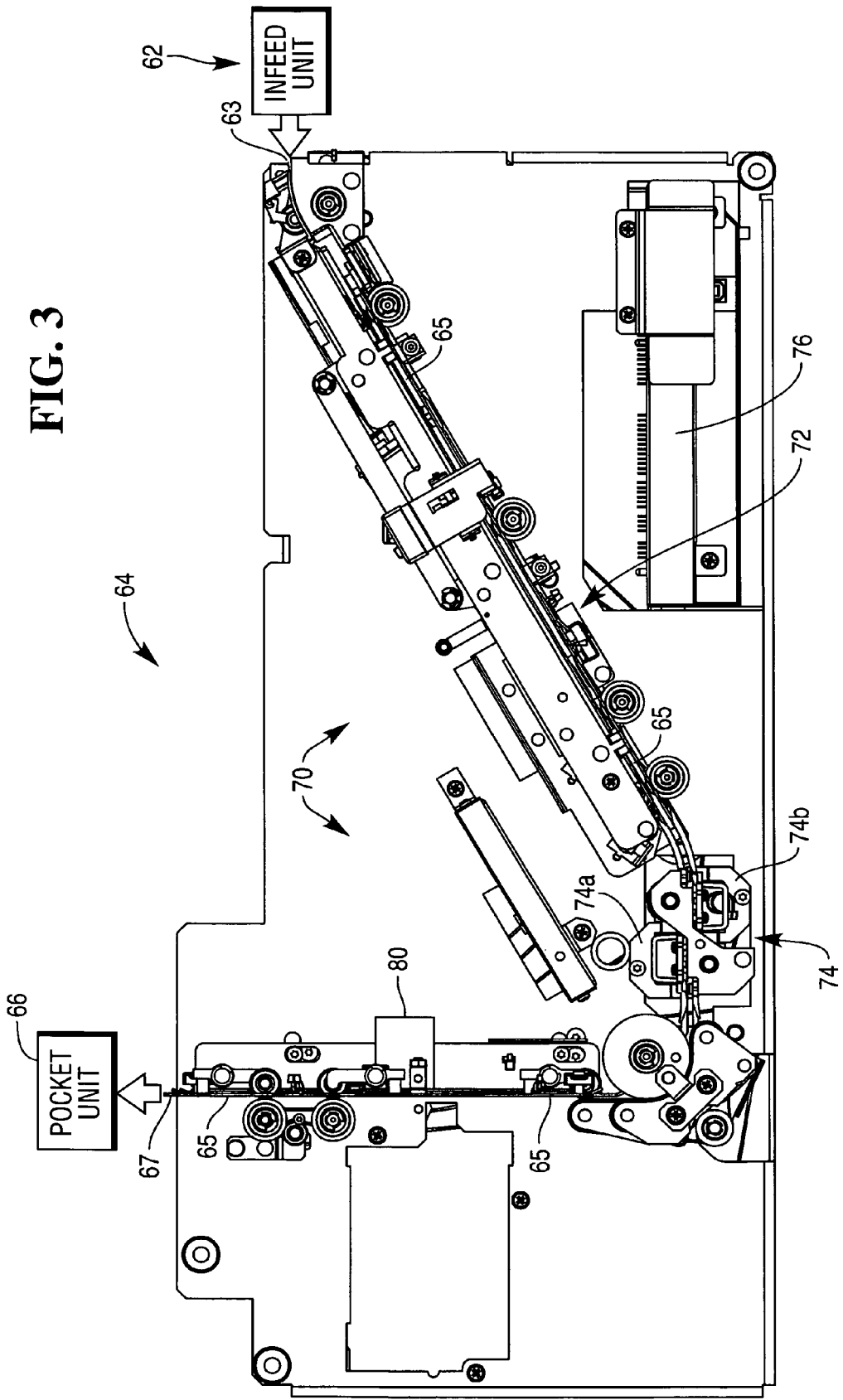

ACCOUNT NO: XXXX5678
TRANSACTION DATE: JANUARY 23, 2002
TRANSACTION AMOUNT: $295.45 DEPOSIT

200

145

Jan 1, 2002
DATE

PAY TO the order of *NORTH POLE, INC.* $ 295.45

*Two Hundred Ninety Five and 45/100* DOLLARS

First National Bank
Chicago, Illinois

MEMO *Goodies*

*James C. Morrison*

⑈000067894⑈ 12345678⑈ 0145

METHODS OF OPERATING A SELF-SERVICE CHECK DEPOSITING TERMINAL TO PROVIDE A CHECK DEPOSIT TRANSACTION RECEIPT

BACKGROUND

The present invention relates to depositing of checks, and is particularly directed to methods of operating a self-service check depositing terminal, such as a check depositing automated teller machine (ATM), to provide a check deposit transaction receipt.

In a typical check depositing ATM, an ATM customer is allowed to deposit a check (without having to place the check in any deposit envelope) in a publicly accessible, unattended environment. To deposit a check, the ATM customer inserts a user identification card through a user card slot at the ATM, enters the amount of the check being deposited, and inserts the check to be deposited through a check slot of a check acceptor. A check transport mechanism receives the inserted check and transports the check in a forward direction along a check transport path to a number of locations within the ATM to process the check.

If the check is not accepted for deposit, the check transport mechanism transports the check in a reverse direction along the check transport path to return the check to the ATM customer via the check slot. If the check is accepted for deposit, the amount of the check is deposited into the ATM customer's account and the check is transported to a storage bin within the ATM. An endorser printer prints an endorsement onto the check as the check is being transported to and stored in the storage bin. The ATM customer may be charged a service fee for conducting the check deposit transaction. Checks in the storage bin within the ATM are periodically picked up and physically transported via courier to a back office facility of a financial institution for further processing.

In some known check depositing ATMs, a receipt containing an image of the check which has just been deposited is provided to the ATM customer. The check image provided to the ATM customer contains personal information about the check payer, and may also contain personal information about the check payee. In certain ones of these known ATMs, some personal information contained in the check image is blanked out so that it is not printed on the receipt. However, when personal information contained in the check image is blanked out, there is less information provided to the ATM customer about the check deposit transaction. It would be desirable to provide alternative methods of providing a check deposit transaction receipt.

SUMMARY

In accordance with one embodiment of the present invention, a method is provided of operating a self-service check depositing terminal to provide a check deposit transaction receipt. The method comprises receiving a check from a depositor, capturing original check image data which is representative of an image of the check, embedding at least some alphanumeric text data which is representative of alphanumeric text into at least some of the original check image data to provide modified check image data which is representative of a composite image of the check and the alphanumeric text, and printing the composite image of the check and the alphanumeric text onto a check deposit transaction receipt.

BRIEF DESCRIPTION OF THE DRAWINGS

In the accompanying drawings:

FIG. 3 is an elevational view of the check processing module of FIG. 2, looking approximately in the direction of arrow X in FIG. 1, and showing some parts removed and some parts only schematically;

FIG. 6 is a view similar to FIG. 5, and showing the original check image of FIG. 5 which has been modified in accordance with steps illustrated in the flowchart of FIG. 4;

DETAILED DESCRIPTION

Figure 1:
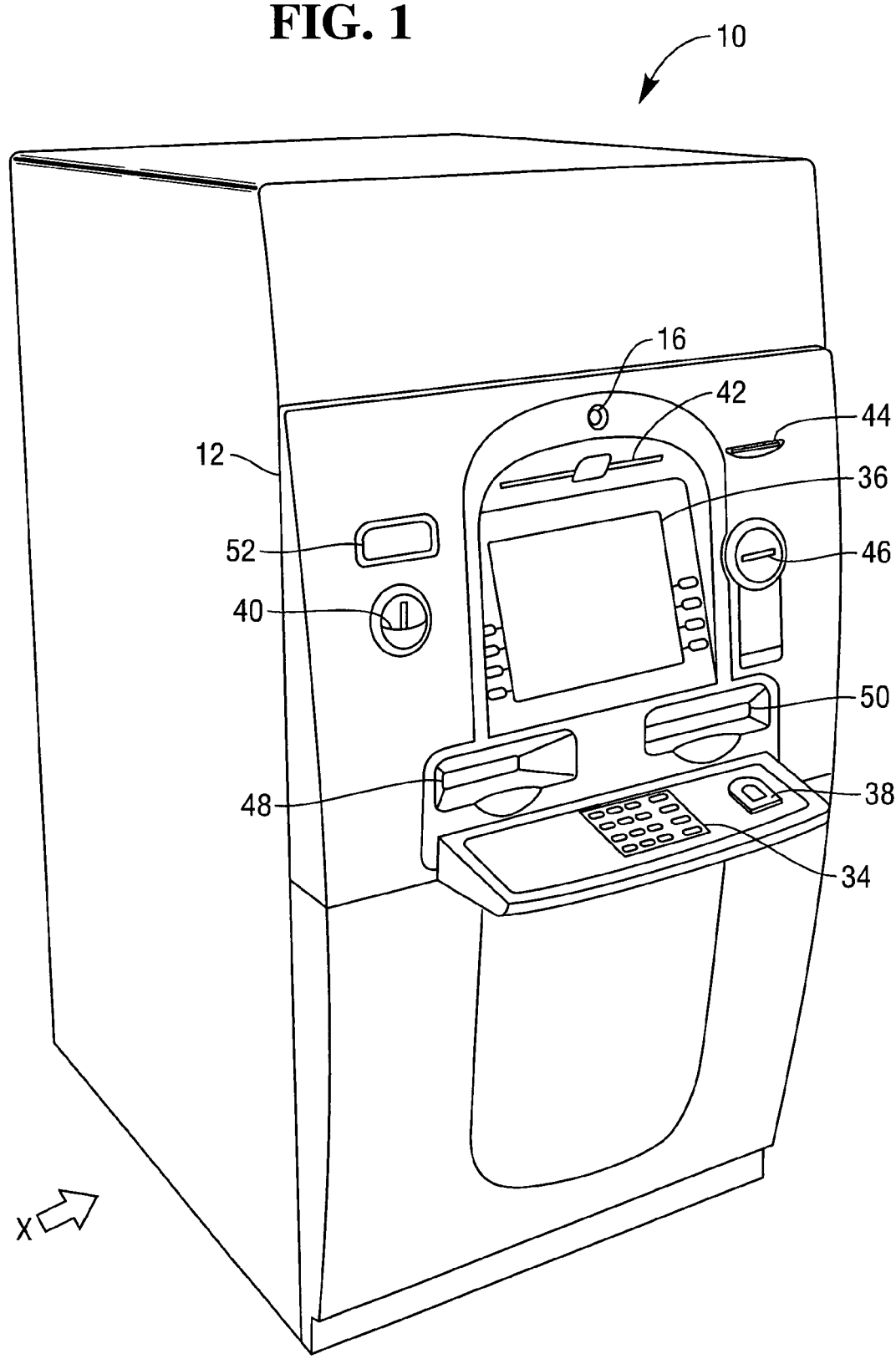
FIG. 1 is a left-front perspective view of an image-based check depositing automated teller machine (ATM) embodying the present invention.

Referring to FIG. 1, a self-service check depositing terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR PERSONAS (trademark) 6676 ATM, available from NCR Financial Solutions Group Limited, Discovery Centre, 3 Fulton Road, Dundee, DD2 4SW, Scotland.

Figure 2:
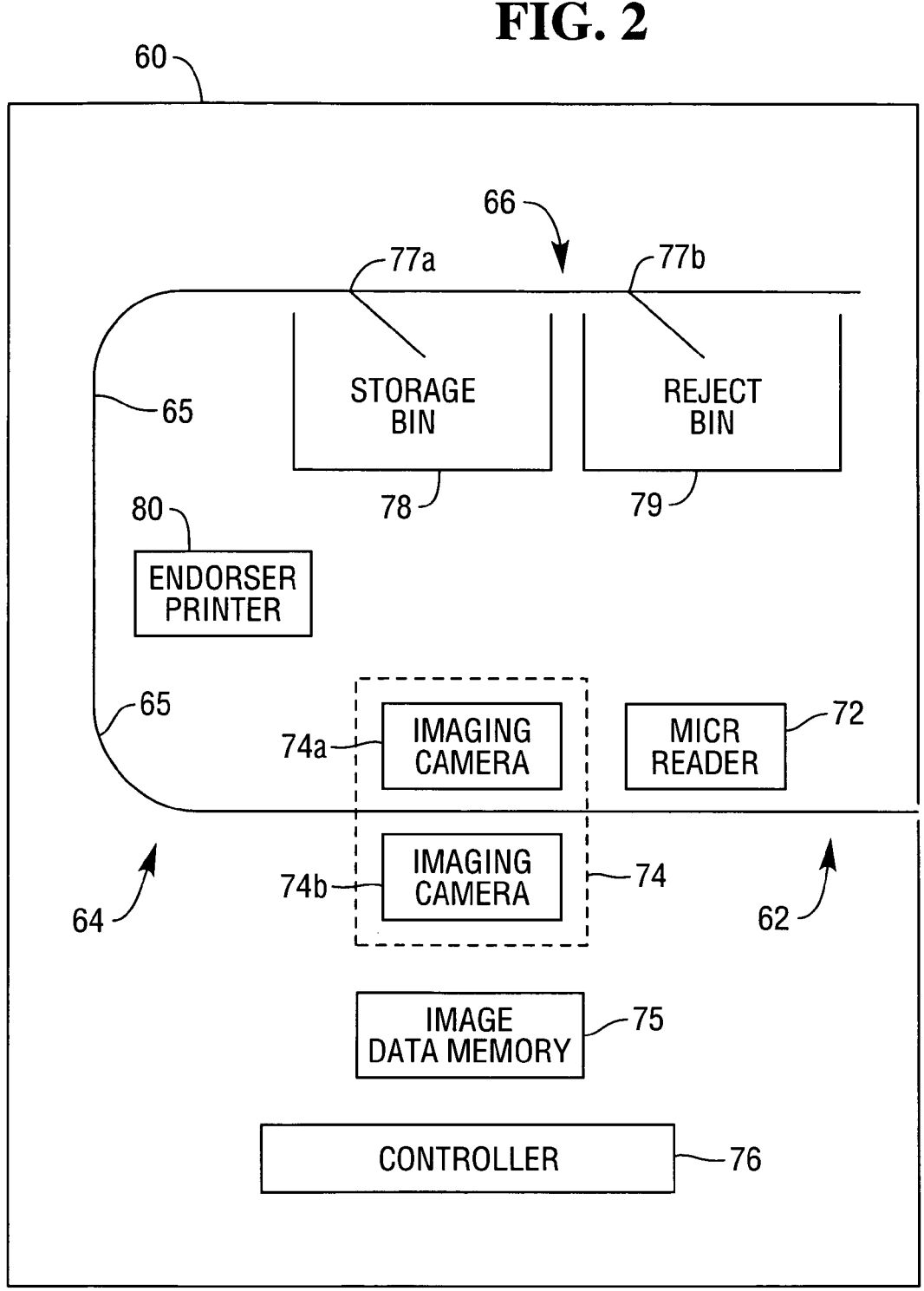
FIG. 2 is a simplified schematic diagram of a part (a check processing module) of the ATM of FIG. 1.

A check processing module (CPM) 60 will now be described with reference to FIG. 2 and FIG. 3. FIG. 2 is a simplified schematic diagram of part of the fascia 12 and main parts of the CPM 60. FIG. 3 is an elevational view of the check processing module of FIG. 2, looking approximately in the direction of arrow X in FIG. 1, and showing some parts removed and some parts only schematically. The CPM 60 is a modified version of a conventional check processing module, such as the check processing module provided with the PERSONAS (trademark) 6676 NCR ATM.

The CPM 60 comprises three main units which includes an infeed unit 62, a transport unit 64, and a pocket unit 66. The infeed unit 62 receives a check which has been deposited into the check input/output slot 52, and transports the check to an inlet 63 of the transport unit 64. The dimensions of the infeed unit 62, such as its run length, may vary depending upon the particular model ATM the CPM 60 is installed. The structure and operation of the infeed unit 62 are conventional and well known and, therefore, will not be described.

The transport unit 64 includes a check input/output transport mechanism 70 which includes an alignment mechanism for aligning a check. The transport mechanism 70 receives a check from the inlet 63, and transports the check along a document track 65 to an outlet 67 of the transport unit 64. The transport unit 64 further includes a magnetic ink character recognition (MICR) head 72 for reading magnetic details on a code line of a check. The transport unit 64 also includes an imager 74 including an upper 74a and lower 74b imaging camera for capturing an image of each side of a check (front and rear). An endorser printer 80 is provided for printing endorsements onto checks. An image data memory 75 is provided for storing images of checks. A controller 76 is provided for controlling the operation of the elements within the CPM 60.

The pocket unit 66 includes a storage bin 78 for storing processed checks. The pocket unit 66 further includes a reject bin 79 for storing rejected checks. Two divert gates 77a, 77b are provided for diverting checks to either the storage bin 78 or the reject bin 79. The structure and operation of the pocket unit 66 are conventional and well known and, therefore, will not be described.

Figure 4A:
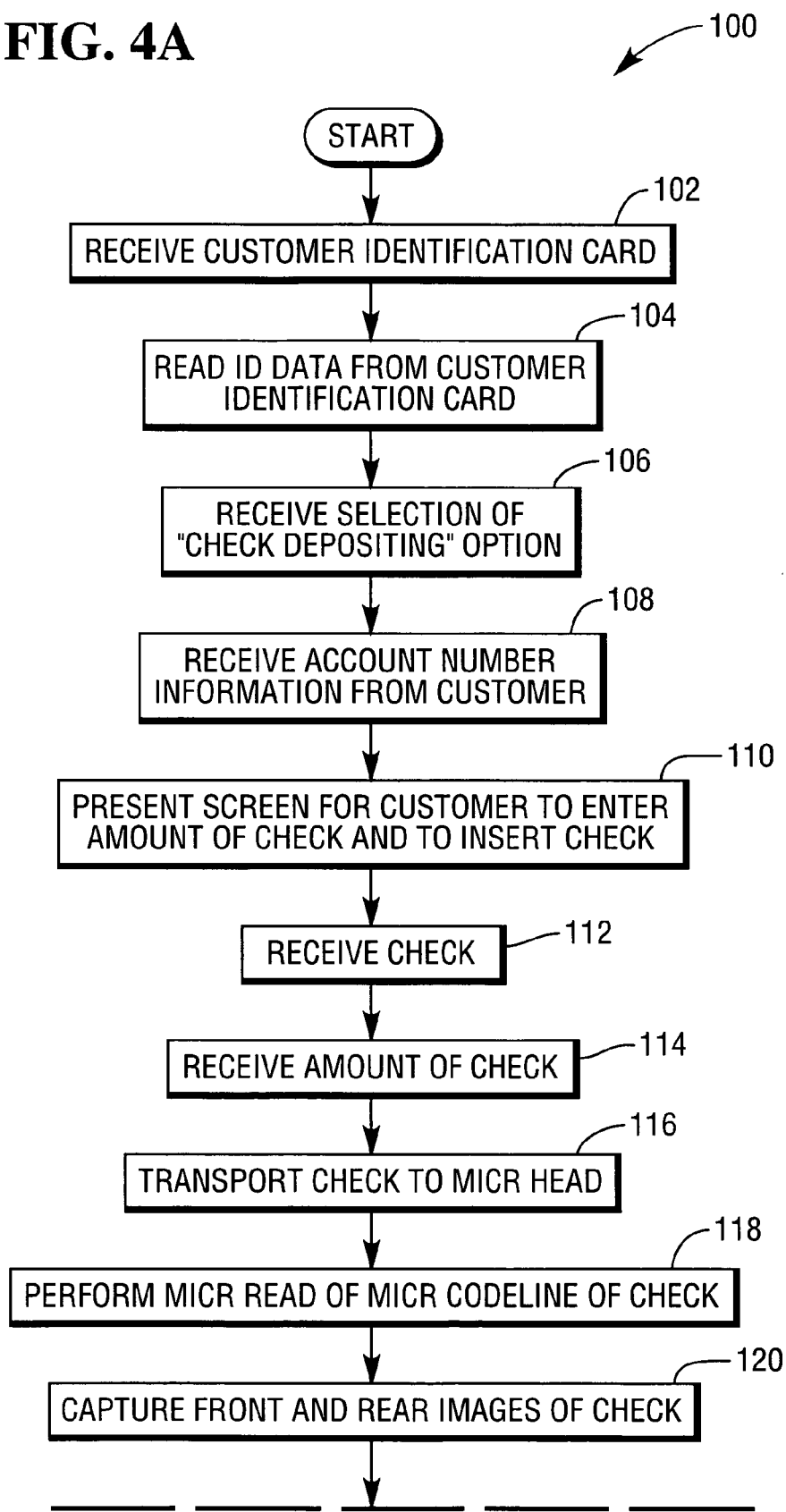
FIG. 4 is a flowchart illustrating steps involved in a check deposit transaction in accordance with one embodiment of the present invention.
Figure 4B:
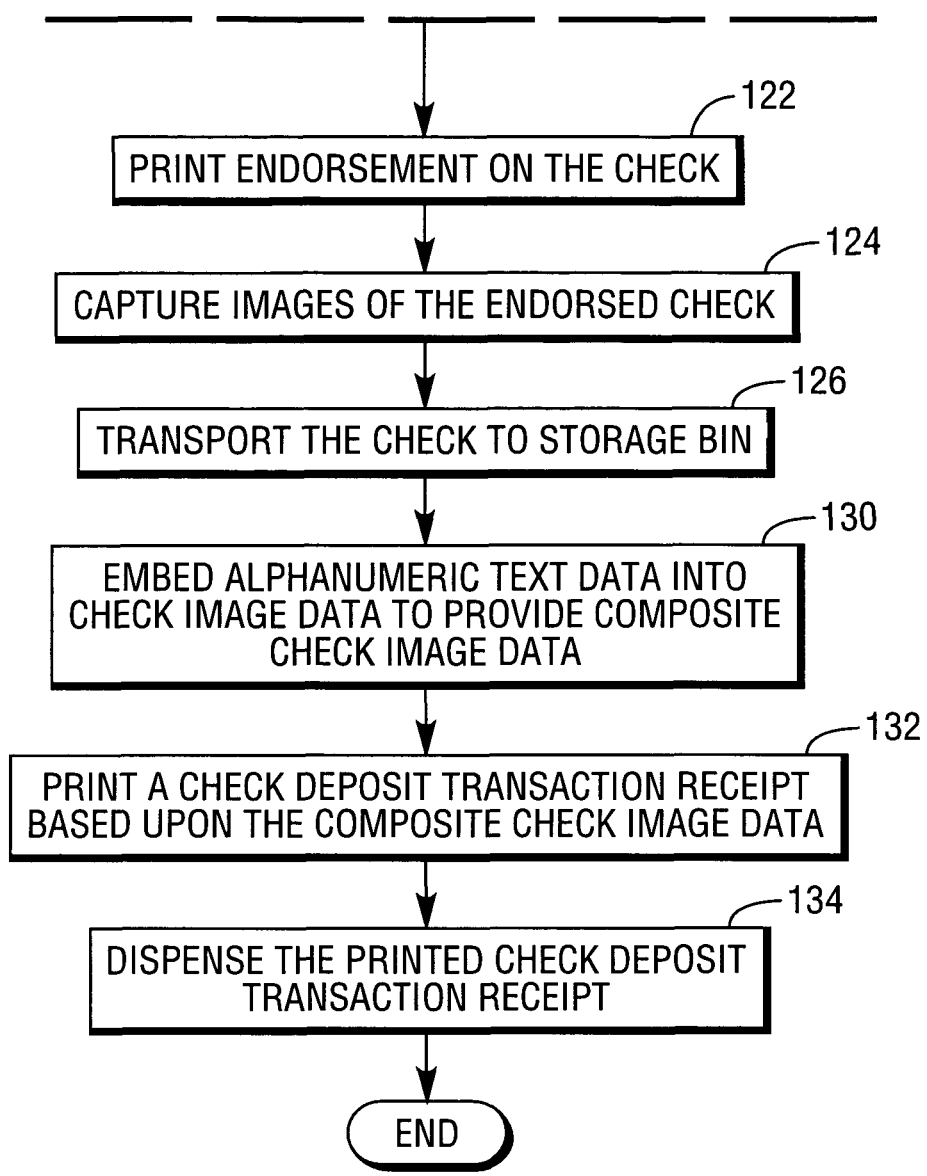

Referring to FIG. 4, a flowchart 100 illustrates steps involved in a check deposit transaction in accordance with one embodiment of the present invention. In the check deposit transaction, the ATM customer inserts a customer identification card into the card reader slot 46 and enters identifying data, like a personal identification number (PIN) to start the transaction (steps 102 and 104). The ATM customer is presented with a screen on the display 36 to select a transaction from a list of transaction options, and selects the "check depositing" option (step 106). The ATM customer also selects an account into which the deposit is to be made (step 108).

The ATM customer is presented with a screen to enter the amount of the check via the keyboard 34, and to insert the check to be deposited through the check input/output slot 52 (step 110). The ATM customer inserts the check (step 112), and enters the amount of the check (step 114). The controller 76 receives the amount of the check. The infeed unit 62 receives the check and transports the check to the inlet 63 of the transport unit 64. The transport mechanism 70 of the transport unit 64 receives the check and transports the check (step 116) to the MICR head 72 where the MICR codeline on the check is read (step 118).

The transport mechanism 70 transports the check to the imager 74, where both sides of the check are imaged (step 120). The endorser printer 80 prints endorsement data onto the check (step 122). The endorsed check is then transported to the imager 74 to image the endorsed check (step 124) before it is transported through the outlet 67 to the storage bin 78 of the pocket unit 66 (step 126) for subsequent collection and further processing. Although the above describes both steps 120 and 124 being performed, it is conceivable that only one of these steps be performed. Preferably, step 120 is performed, and step 124 is optionally performed.

Figure 5:
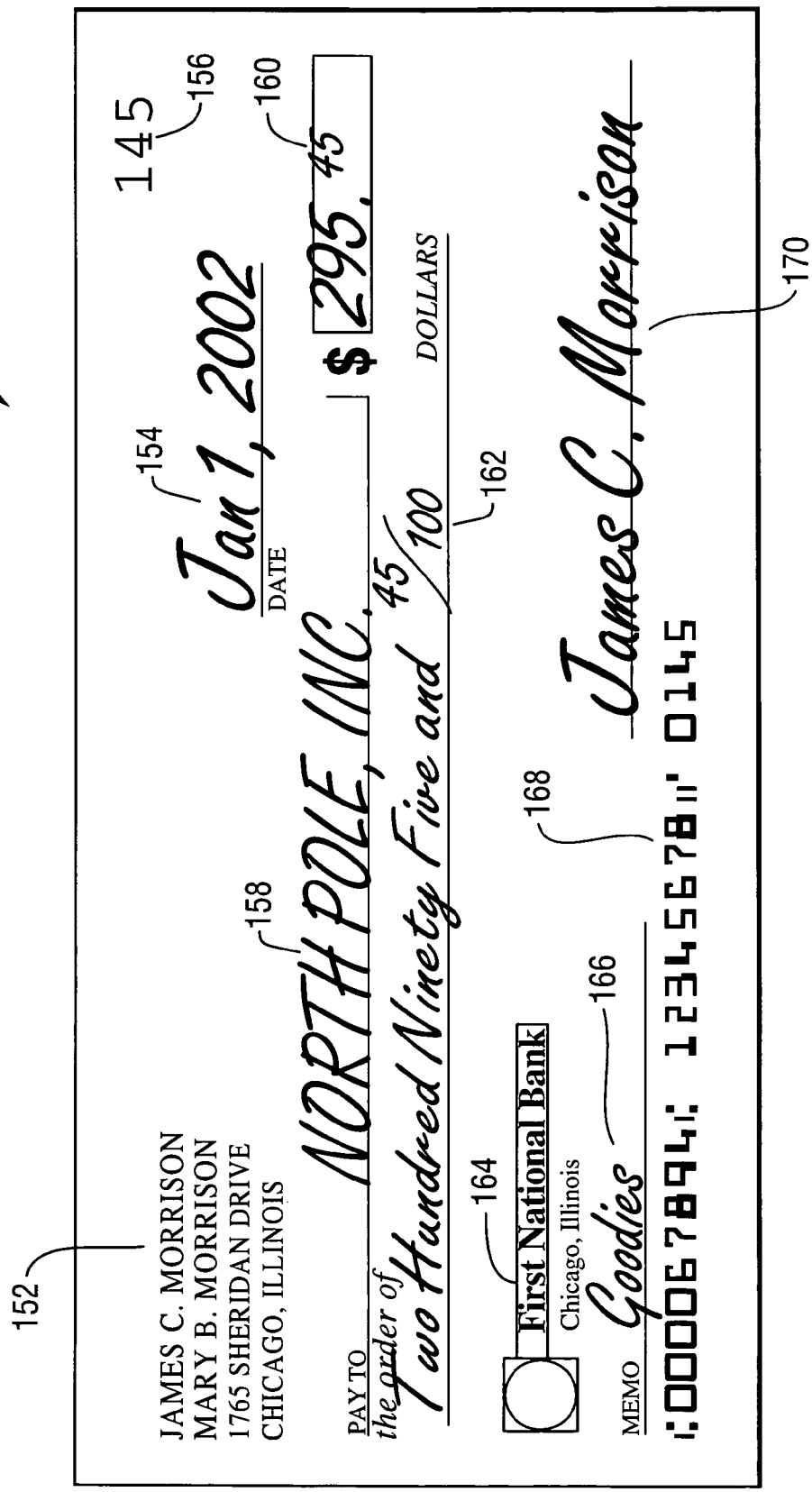
FIG. 5 is a front view of an original check image.

An example of an original front check image captured by the imager 74 is shown in FIG. 5, and is designated with reference numeral "150". The check features shown in FIG. 5 include a payer field 152, a date field 154, a check number field 156 located in the upper-right corner of the check 150, a payee field 158, a courtesy amount field 160, a legal amount field 162, a paying bank name field 164, a memo field 166, a magnetic ink character recognition (MICR) codeline field 168, and a payer signature field 170.

In accordance with one embodiment of the present invention, alphanumeric text data is embedded (step 130 in FIG. 4) into original check image data which is representative of the original check image 150 (FIG. 5) to provide composite check image data which is representative of a composite check image 200 such as shown in FIG. 6. The composite check image 200 includes at least a portion of the original check image 150 (FIG. 5) and alphanumeric text 202 (FIG. 6) represented by the embedded alphanumeric text data. More specifically, pixels which are associated with the alphanumeric text data (i.e., the s alphanumeric text 202 shown in FIG. 6) are incorporated into pixels which are associated with the original check image data (i.e., the original check image 150 shown in FIG. 5) to provide a modified arrangement of pixels which are associated with the composite check image 200 (FIG. 6). Preferably, the alphanumeric text 202 provides information which is related to the check deposit transaction, such as shown in FIG. 6. As shown in FIG. 6, the pixels which are representative of the embedded alphanumeric text 202 have displaced pixels which were representative of payer information contained in the payer field 152 shown in FIG. 5.

Figure 7:
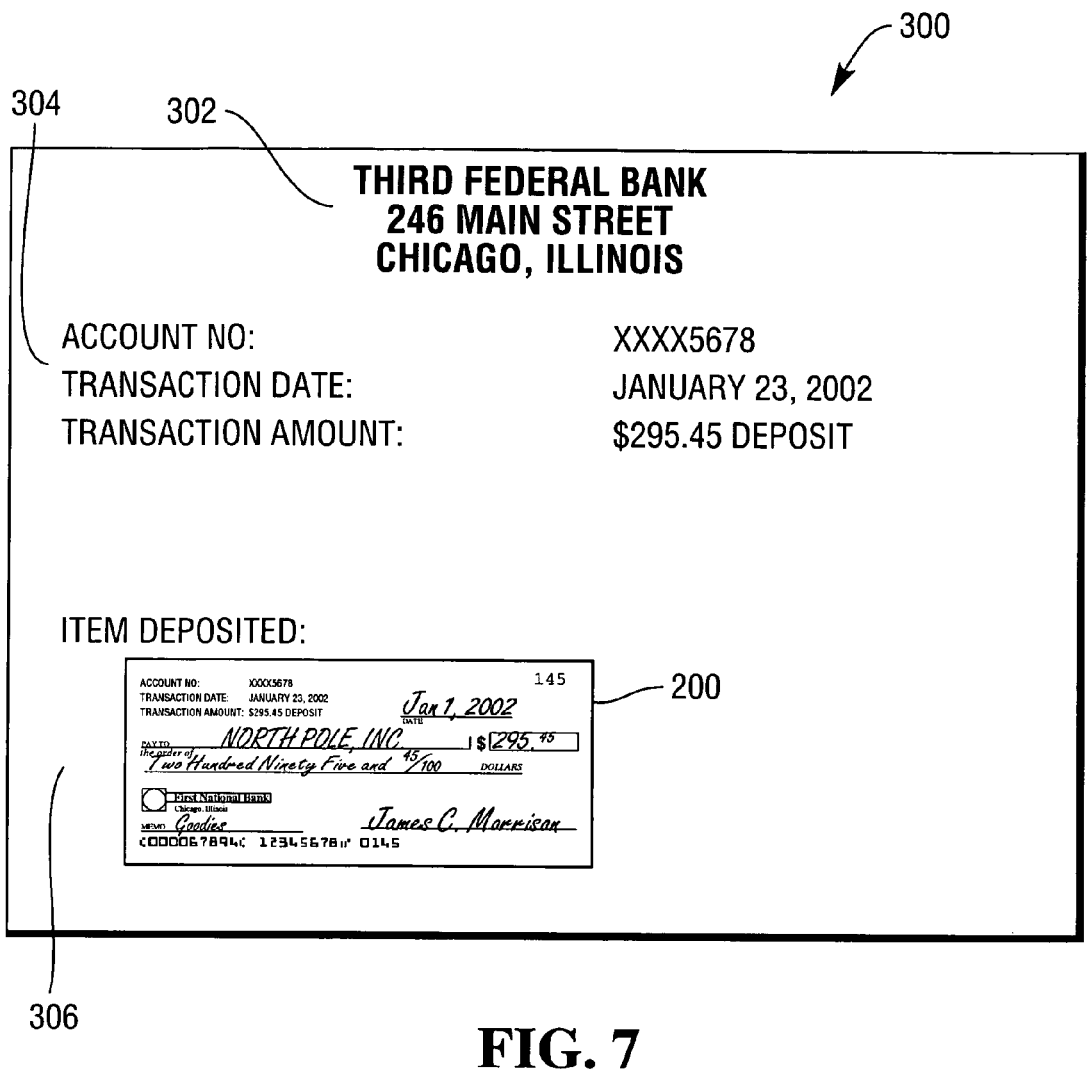
FIG. 7 is an illustration of a check deposit transaction receipt which includes the modified check image of FIG. 6.

After the composite check image 200 (FIG. 6) has been provided in step 130 (FIG. 4), a check deposit transaction receipt is printed (step 132). An example of the check deposit transaction receipt is shown in FIG. 7 and designated with reference numeral "300". The check deposit transaction receipt 300 is printed based upon the composite check image data which was provided in step 130. As shown in FIG. 7, the receipt 300 has a field 302 which contains information about the bank at which the check deposit transaction is being conducted. The receipt 300 may also have a field 304 which contains information relating to the check deposit transaction. As shown in FIG. 7, the information contained in the field 304 comprises all of the information contained in the alphanumeric text 202 of the composite check image 200 (FIG. 6). The receipt 300 shown in FIG. 7 also has a field 306 which contains the composite check image 200. The printed receipt 300 is then delivered to the ATM customer (step 134 in FIG. 4).

Although the above description describes the field 304 as comprising all of the information contained in the alphanumeric text 202 of the composite check image 200 of FIG. 6, it is conceivable that the information contained in the field 304 may comprise only some of the information contained in the alphanumeric text 202 of the composite check image 200. It is also conceivable that the field 304 may contain no information at all, or may contain information which is not contained in the alphanumeric text 202 of the composite check image 200.

By blanking out the payer information contained in the payer field 152 (FIG. 5) and replacing the blanked out area with information 202 (FIG. 6) relating to the check deposit transaction, the identity of the check payer is being protected. Identity protection for the check payer can be further enhanced by blanking out the payer's signature contained in the payer signature field 170 (FIG. 5) and replacing the blanked out area with other information. If the ATM customer should happen to lose the check deposit transaction receipt 300, the identity of the check payer is not compromised. Accordingly, the identity of the check payer is being protected at the same time the ATM customer depositing the check is being provided with assurance (via the composite check image 200 on the receipt 300) that the check has been deposited.

Referring to FIGS. 8, 9, 10 and 11, another embodiment of the present invention is illustrated. Since the embodiment illustrated in FIGS. 8, 9, 10 and 11, is generally similar to the embodiment illustrated in FIGS. 4, 5, 6 and 7, similar reference numerals are used to designate similar components, the suffix "c" being associated with the embodiment of FIGS. 8, 9, 10 and 11 to avoid confusion.

Figure 8A:
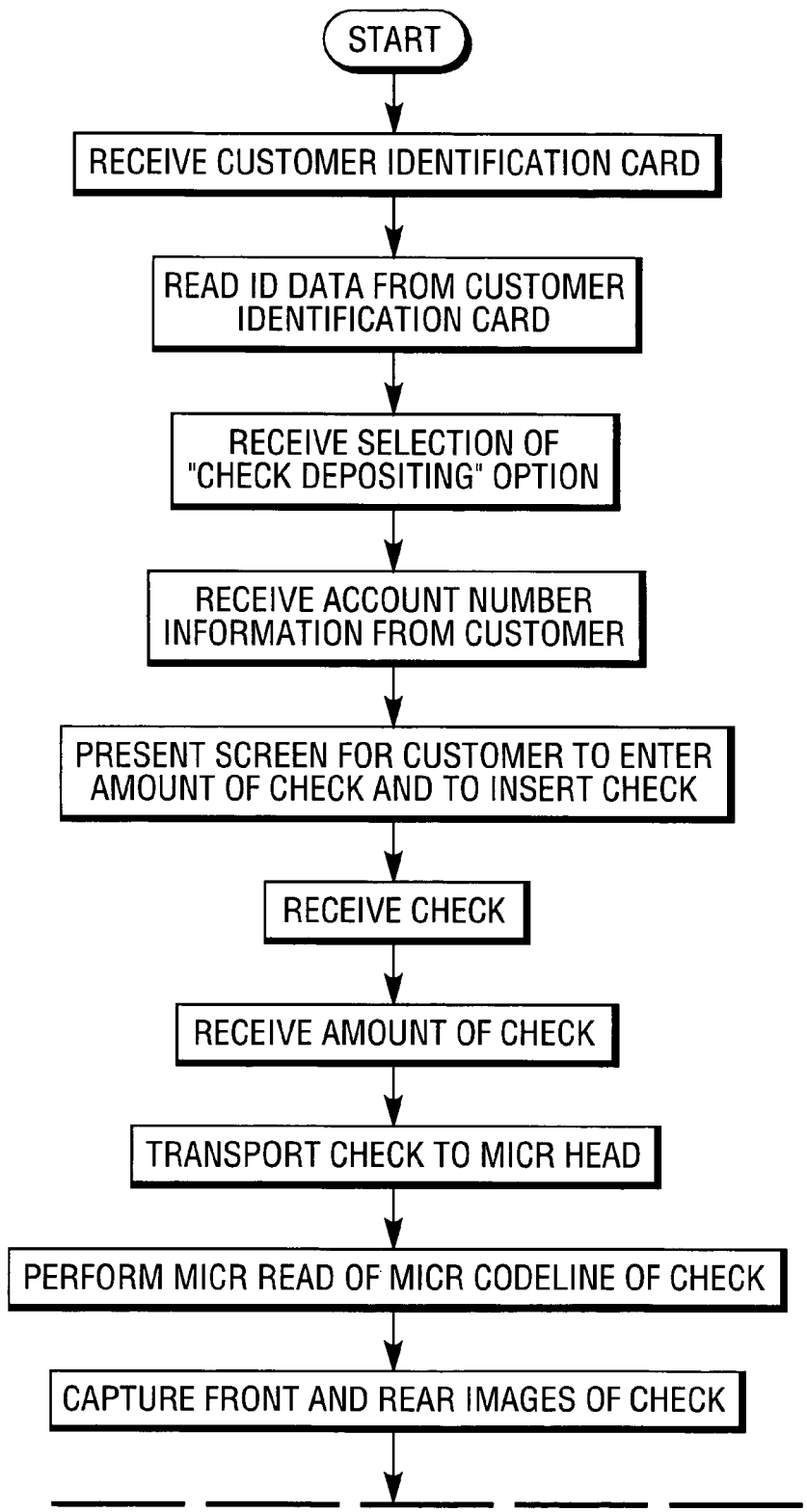
FIG. 8 is a flowchart illustrating steps involved in a check deposit transaction in accordance with another embodiment of the present invention.
Figure 8B:
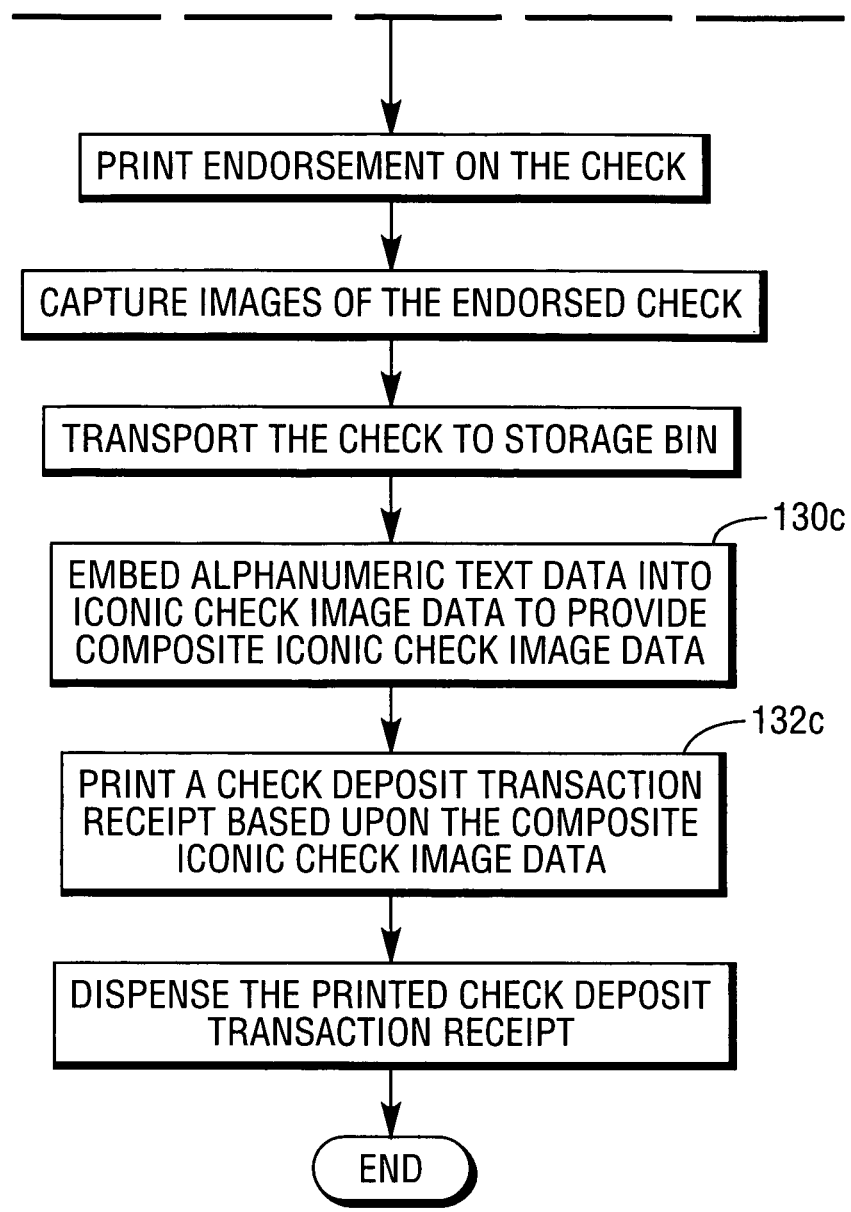
Figure 9:
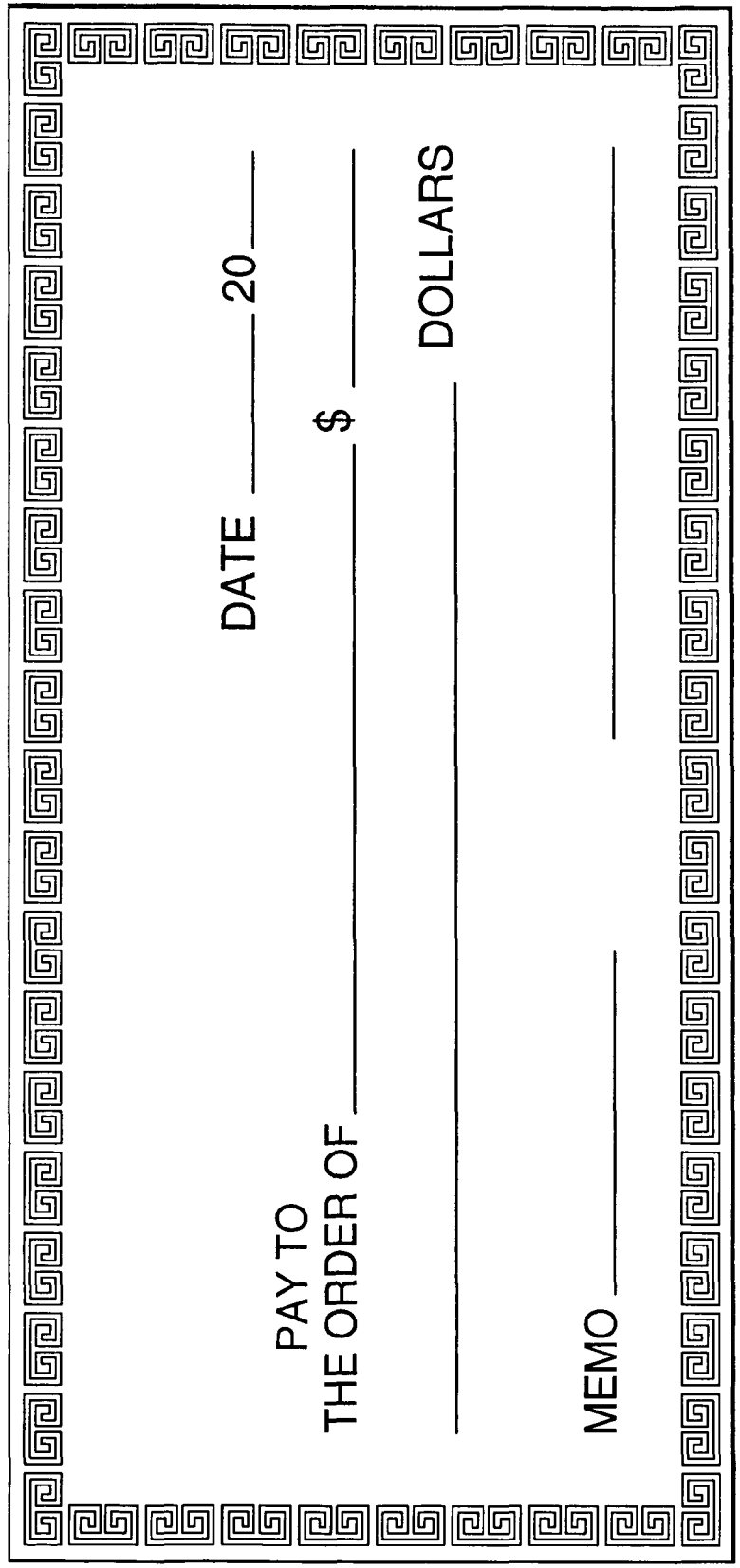
FIG. 9 is a front view of an iconic check image.

The flowchart 100*c* of FIG. 8 is the same as the flowchart of FIG. 4, except that steps 130*c* and 132*c* shown in FIG. 8 are different from steps 130 and 132 shown in FIG. 4. More specifically, alphanumeric text data is embedded (step 130*c* in FIG. 8) into check image data which is representative of a check icon (such as shown in FIG. 9) to provide composite iconic check image data which is representative of a composite iconic check image 200*c* such as shown in FIG. 10.

The composite iconic check image 200*c* (FIG. 10) includes an image of a check icon and the alphanumeric text 202*c* represented by the embedded alphanumeric text data. Pixels associated with the alphanumeric text data (i.e., the alphanumeric text 202*c* shown in FIG. 10) is incorporated into pixels which are associated with the check image data which is representative of the check icon (FIG. 9) to provide a modified arrangement of pixels which are associated with the composite iconic check image 200*c* (FIG. 10).

After the composite iconic check image 202*c* has been provided in step 130*c* (FIG. 8), the check deposit transaction receipt 300*c* (FIG. 11) is printed. The check deposit transaction receipt 300*c* is printed based upon the composite iconic check image data which was provided in step 130*c*. The receipt 300*c* shown in FIG. 11 has the field 306*c* which contains the composite iconic check image 202*c* (FIG. 10).

Figure 10:
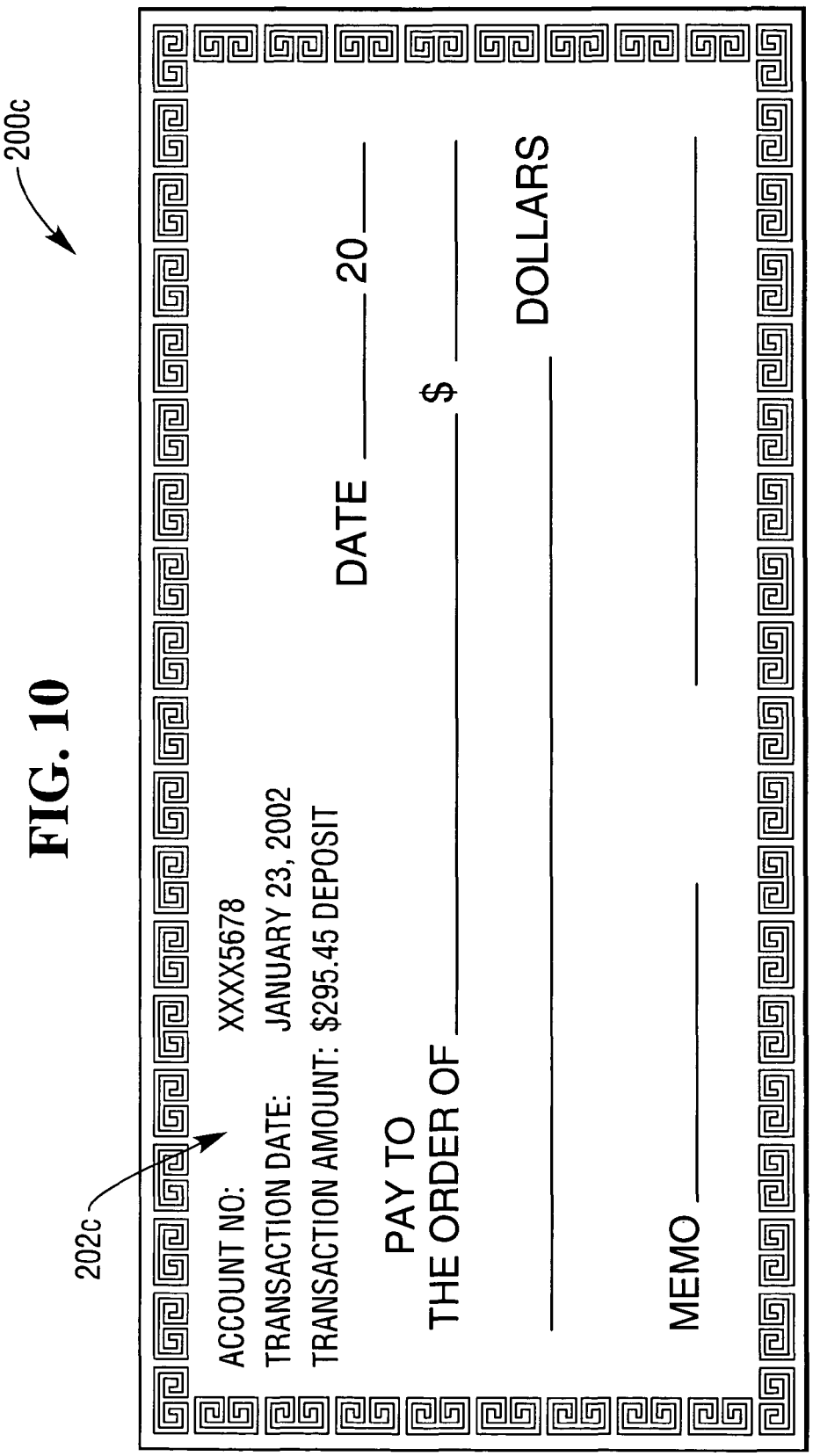
FIG. 10 is a view similar to FIG. 9, and showing the iconic check image of FIG. 9 which has been modified in accordance with steps illustrated in the flowchart of FIG. 8.
Figure 11:
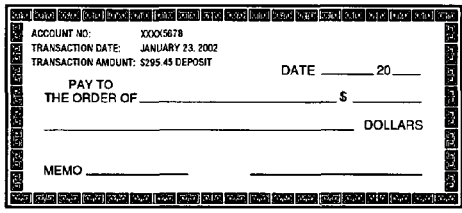
FIG. 11 is an illustration of a check deposit transaction receipt which includes the modified check image of FIG. 10.

It should be apparent that the composite iconic check image 200*c* shown in FIG. 10 is that of the check icon (FIG. 9) and the alphanumeric text 202*c* (FIG. 10) instead of the original check (FIG. 5) and the alphanumeric text 200 (FIG. 6). The iconic check image 150*c* shown in FIG. 9 is just one example of a check icon which can be used. It is conceivable that other types of check icons may be used.

Although the above-description describes the PERSONAS (trademark) 6676 NCR ATM embodying the present invention, it is conceivable that other models of ATMs, other types of ATMs, or other types of self-service check depositing terminals may embody the present invention. Self-service depositing terminals are generally public-access devices that are designed to allow a user to conduct a check deposit transaction in an unassisted manner and/or in an unattended environment. Self-service check depositing terminals typically include some form of tamper resistance so that they are inherently resilient.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating a self-service check depositing terminal to provide a check deposit transaction receipt, the method comprising:
   receiving a check from a depositor;
   retrieving iconic check image data which is representative of an image of an iconic check which is other than the check received from the depositor;
   embedding and printing at least some alphanumeric text data which is representative of alphanumeric text related to the check deposit transaction into at least some of a front side of the retrieved iconic check image data by modifying the iconic check image data to provide modified iconic check image data which is representative of a composite image of the iconic check and the alphanumeric text;
   removing depositor identifying information from the composite image and the alphanumeric text, and wherein removing further includes removing Magnetic Ink Character Recognition (MICR) data from the composite image; and
   printing the composite image of the iconic check and the alphanumeric text onto a check deposit transaction receipt but not an actual image of the check received from the depositor.

2. A method according to claim 1, wherein the step of embedding includes:
   incorporating pixels which are associated with the alphanumeric text data into pixels which are associated with the iconic check image data to provide a modified arrangement of pixels which are associated with the composite image of the iconic check and the alphanumeric text.

3. A method according to claim 1, wherein the alphanumeric text provides information which relates to the check deposit transaction.

4. A method according to claim 1, further comprising:
   dispensing the printed receipt to the depositor.

* * * * *